Figures 1, 2, 3:
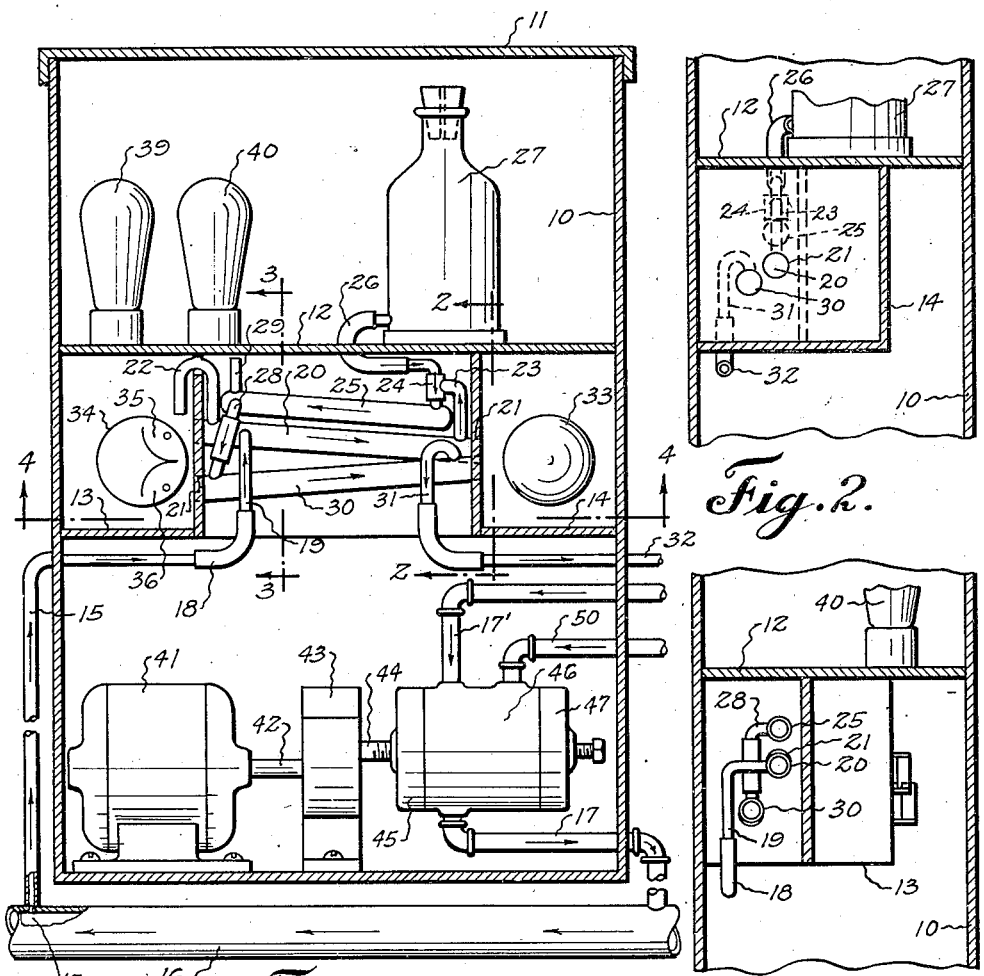

Dec. 15, 1942.   M. H. ROWE   2,305,108
METHOD OF AND MEANS FOR PURIFYING WATER
Filed March 19, 1938   2 Sheets-Sheet 1

Inventor
Marion H. Rowe
By Jack Ashley
Attorney

Dec. 15, 1942.  M. H. ROWE  2,305,108
METHOD OF AND MEANS FOR PURIFYING WATER
Filed March 19, 1938  2 Sheets-Sheet 2
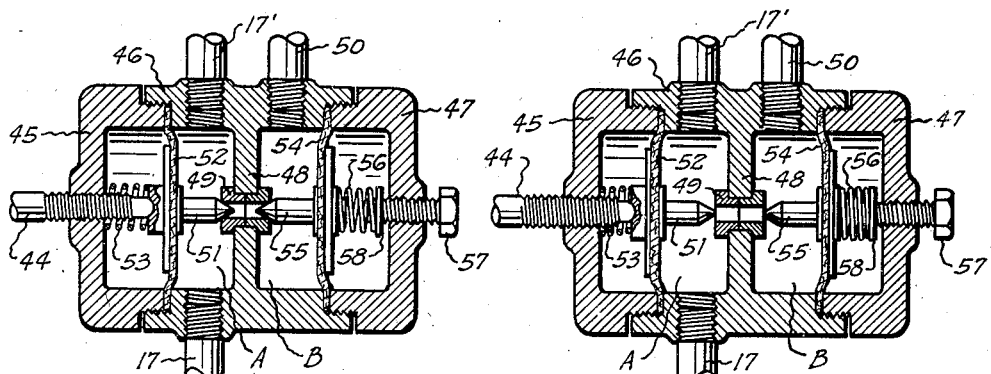
Fig. 5.  Fig. 6.
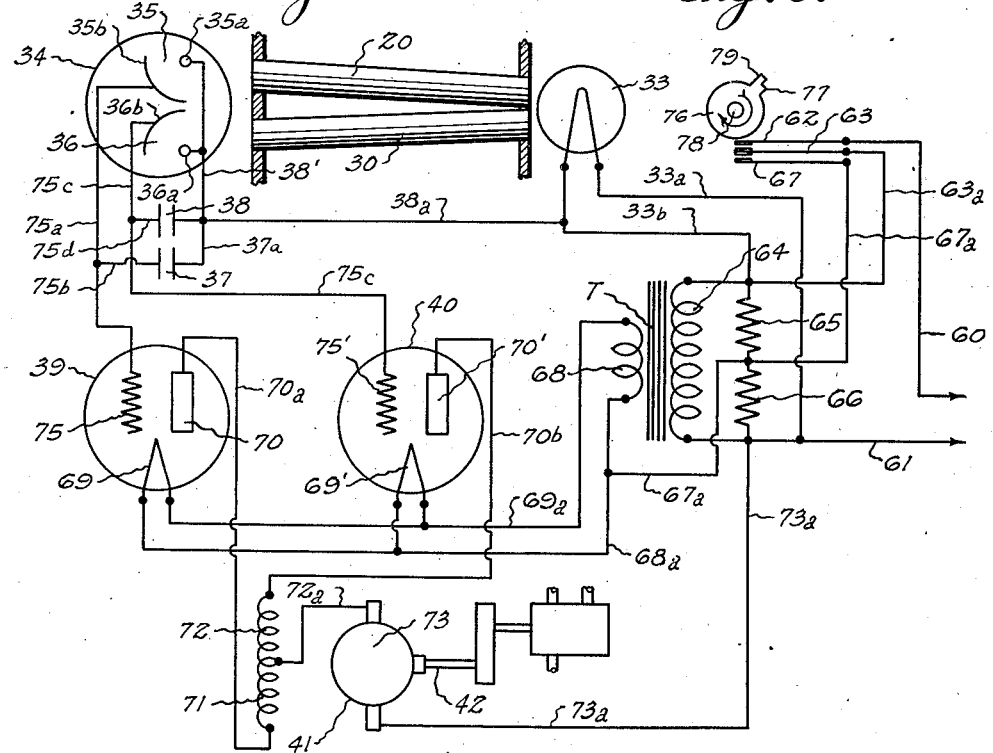
Fig. 7.
Fig. 8.  Fig. 9.
Inventor
Marion H. Rowe
By Jack A. Ashley
Attorney Patented Dec. 15, 1942

2,305,108

UNITED STATES PATENT OFFICE 2,305,108

METHOD OF AND MEANS FOR PURIFYING WATER

Marion H. Rowe, Dallas, Tex., assignor of one-half to Joseph H. Reynolds, Cisco, Tex.

Application March 19, 1938, Serial No. 196,877

8 Claims. (Cl. 210—28)

This invention relates to new and useful improvements in methods of and means for purifying water.

One object of the invention is to provide an improved chlorinator for controlling and metering the introduction of chlorine in a water supply line, whereby the water is sterilized.

An important object of the invention is to provide an improved chlorinating device having means for determining the amount of chlorine in a water line, together with means for increasing or decreasing the introduction of additional chlorine into the line in accordance with the amount of chlorine already present therein, whereby a sufficiency of chlorine may be maintained in the line under all conditions and at all times.

Another object of the invention is to provide an improved chlorinator having a testing apparatus for determining the amount of chlorine in a water line, and a metering device actuated by the testing apparatus for automatically metering the introduction of chlorine in accordance with the results of said test, whereby more or less chlorine is added as needed, and sufficient chlorine for sterilization is admixed with the water at all times.

A further object of the invention is to provide a chlorinator including an improved testing apparatus wherein a portion of the chlorinated water is admixed with acid orthotoluidine after which the light absorption qualities of the chlorinated water and of the chlorinated water with orthotoluidine added, are tested to determine the amount of chlorine in the water.

A particular object of the invention is to provide an improved chlorinator of the character described, wherein light rays are projected through chlorinated water and also through chlorinated water having orthotoluidine added, onto photoelectric cells which are utilized to actuate gaseous triodes; the triodes in turn, operating a metering device which controls the introduction of chlorine into the water line, whereby the chlorine supply is controlled by the relative difference of the light absorption qualities of the chlorinated water and the chlorinated water and orthotoluidine solution, said qualities indicating the sufficiency of chlorine in the water for the purposes of sterilization of said water.

Still another object of the invention is to provide an improved chlorinator having a metering device for introducing chlorine into a water line, which is so constructed that in the event either the water or chlorine pressure falls below a predetermined amount, the chlorine supply is automatically shut off to prevent further introduction of chlorine.

A construction designed to carry out the invention will be hereinafter described, together with other features of the invention.

Figure 4:
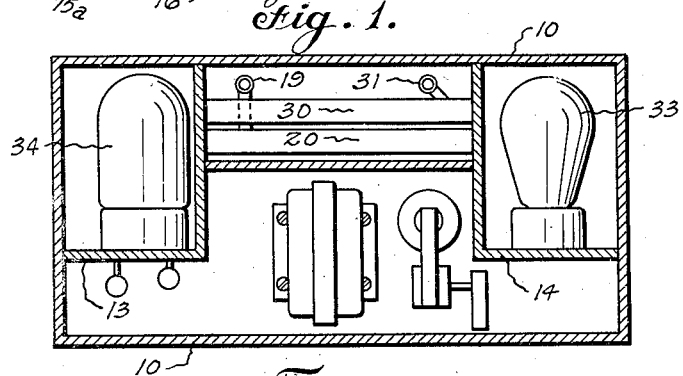

The invention will be more readily understood from a reading of the following specification and by reference to the accompanying drawings, in which an example of the invention is shown, and wherein:

Figure 1 is a transverse, vertical, sectional view of a chlorinator constructed in accordance with the invention, Figure 2 is a vertical, sectional view, taken on the line 2—2 of Figure 1, Figure 3 is a vertical, sectional view, taken on the line 3—3 of Figure 1, Figure 4 is a horizontal, cross-sectional view, taken on the line 4—4 of Figure 1, Figure 5 is an enlarged sectional view, taken through the metering device and showing the same with the metering elements in a seated position, Figure 6 is a similar view with the metering elements unseated, Figure 7 is a wiring diagram, and Figures 8 and 9 are schematic views, showing the various positions of the timing cam, which periodically operates the device.

In the drawings, the numeral 10 designates a casing having a substantially rectangular shape in cross-section and being constructed of metal, or other suitable material. The casing is open at its top or upper end and a removable cover 11 normally closes said open end. A transverse platform or deck 12 extends across the interior of the casing at the upper portion thereof, while angular partitions 13 and 14 are secured to the underside of the deck and to the walls of the casing, as is clearly shown in Figures 1 to 4. The angular partitions form chambers within the casing. As will be explained, the entire testing and metering apparatus is mounted within the interior of the casing.

As is well known, liquid chlorine is widely used for sterilizing and purifying water to make the same adaptable for drinking purposes. The chlorine acts to destroy germs and other harmful matter which is normally present in the water and which is injurious to humans. When the chlorine is introduced, it reacts chemically with the harmful matter in the water to bring about the destruction of such matter, and this chemical reaction makes it difficult to ascertain the presence of chlorine. However, if chlorine is introduced in an excess amount, that is, if more chlorine is introduced into the water than is necessary to destroy the harmful matter therein, then it is possible to determine or visibly observe this excess amount of chlorine by the well known "color test." The color test merely consists in adding acid orthotoluidine to the chlorinated water and if an excess amount of chlorine is present, the water becomes colored. The particular color of the water indicates the amount of excess chlorine and standard color charts are available on the open market. From the foregoing, it will be manifest that if only sufficient chlorine is added to destroy the harmful matter in the water, no coloration will occur upon the introduction of acid orthotoluidine which is the reagent for the color test. However, if an excess amount of chlorine, or more chlorine than is necessary to destroy the harmful matter, is present in the water, the introduction of the acid orthotoluidine will cause the water to be colored, the particular color or hue being dependent upon the amount of chlorine in the water. Thus, the particular color of the water may be employed to indicate the presence of chlorine in excessive amounts and by introducing the reagent, together with sufficient chlorine to maintain the water a predetermined color, assurance is had that sufficient chlorine for sterilizing purposes is present in the water.

In carrying out the invention, a pipe or line 15 leads from a main water supply pipe 16, the latter being the usual pipe which supplies the consumer with water. The water in the pipe 16 is chlorinated by the introduction of liquid chlorine which is introduced through a chlorine line 17 connected in the pipe 16. The line 15 has a restricted opening 15a adjacent the pipe 16 and extends from said pipe through one side of the casing into the interior thereof. The inner end of the line is connected by a flexible hose 18 to the lower end of a vertical conductor 19. The conductor is preferably made integral with a tube 20 which is disposed at an inclination in a horizontal plane with the interior of the casing. The ends of the tube 20 are closed and are supported in openings 21 formed in the vertical portions of the angular partitions 13 and 14. The closed ends of said tube are constructed of transparent material to permit light rays to pass therethrough and for expediency in manufacture, it is preferable that the entire tube 20 and conductor 19 be constructed of glass. The conductor 19 is connected in the side of the tube at its higher end and communicates with the interior thereof, whereby some of the chlorinated water from the main supply pipe 16 may flow through the line 15, conductor 19 and into the higher end of said tube. Due to the inclination of the tube, the chlorinated water flows downwardly by gravity to the lower end of said tube but since the ends of said tube are closed it cannot escape from said ends. The higher end of the tube 20 is provided with an inverted U-tube 22 which is open to atmosphere and which permits escape of any air trapped in the tube 20.

The top of the U-tube 22 is the highest point in the apparatus through which the water flows and therefore, this tube acts as a header to cause flow through the tube 20. From the lower end of the tube 20, the chlorinated water flows upwardly through an angular conductor 23. This conductor 23 has connection, intermediate its ends, with a line 24 which extends upwardly from the lower end of a second inclined tube 25 which is located above the tube 20 (Figure 1). The extremity of the conductor 23 is connected through a flexible hose 26, which passes through the deck 12, with a container 27 supported on said deck. This container contains a supply of acid orthotoluidine, or other reagent, and manifestly, the reagent flows from said container into the conductor 23, from where it passes through the line 24 to the tube 25 with the chlorinated water flowing from the tube 20 and said water is colored in accordance with the excess amount of chlorine present therein.

The flow is upwardly through the mixing tube 25 and then downwardly through a conductor 28, which depends from the higher end of said tube. This higher end of the tube 25 is provided with a suitable air relief or vent 29. The chlorinated water, having the reagent therein, flows downwardly through the conductor 28 to a third inclined tube 30 which is located below the tube 20. The tube 30 is inclined oppositely to the tubes 20 and 25 and has its ends mounted in the partitions 13 and 14 in a manner similar to the mounting of the tube 20. The ends of the tube 30 are transparent and it is preferable that these ends, as well as the entire tube be constructed of glass.

The conductor 28 is connected to the lower end of the tube 30 whereby the flow through this tube is toward the higher end thereof. An outlet 31 leads from the top of the tube at its higher end and this outlet has an outlet line 32 connected therewith, the latter passing through the casing wall and leading to a suitable disposal. From the foregoing, it will be obvious that the uncolored chlorinated water is flowing through the tube 20. Acid orthotoluidine or other reagent is added and is admixed with the chlorinated water in the tube 25 to give the water a color in accordance with the excess of chlorine present therein. The colored water is then conducted through the tube 30 which is located below the tube 20. Both the tubes 20 and 30, which carry the uncolored and colored water respectively, have their transparent ends exposed to the interior of the chambers formed by the angular partitions 13 and 14.

For determining the shade or depth of the color of the water in the tube 30 with relation to the uncolored water in the tube 20 and thereby ascertain the excess amount of chlorine present in said water, an ordinary incandescent lamp or bulb 33 is located within the chamber formed by the angular partition 14. The partition is constructed of wood, metal or other non-transparent material and, as explained, the transparent ends of the tubes 20 and 30 are exposed to the interior of the chamber. Therefore, when the lamp 33 is illuminated, the light rays therefrom are directed longitudinally through the tubes which have the water flowing therethrough. Since the water in the tube 20 is uncolored, while the water in the tube 30 is colored, more light will pass through the tube 20, due to the absorption of light by the colored water in the tube 30. The amount of light absorption is dependent upon the color of the water, which color will vary with the excess amount of chlorine present in the water. Thus, more light rays from the lamp 33 will pass through the tube 20 then through the tube 30, and this difference is dependent upon the excess amount of chlorine in the water.

For recording the difference in the amount of light rays passing through the two tubes 20 and 30, and for utilizing such difference to control the chlorine supply to the main pipe 16, a twin photo tube 34 is mounted in the chamber formed by the angular partition 13. This tube includes a pair of photo-electric cells 35 and 36 which are located in alinement with the ends of the tubes 20 and 30. The cell 35 receives the light rays which pass through the tube 20, while the cell 36 receives the light rays passing through the tube 30. The photoelectric cells are utilized to discharge condensers 37 and 38 (Figure 7), which are electrically connected thereto, as will be explained. The condensers are electrically connected to gaseous triode tubes 39 and 40, which triodes control a current flow to a two winding electric motor 41, as will be explained. The triodes are mounted within the casing on the deck 12, while the motor is supported on the bottom of the casing. The triode 39 acts to close a circuit to the motor to rotate the motor shaft 42 in one direction, while the triode 40 closes the circuit to the motor to rotate the shaft in an opposite direction. The operation of the photoelectric cells 35 and 36, condensers 37 and 38, and triodes 39 and 40 will be hereinafter described with the detailed outline of the wiring diagram.

The motor shaft 42 drives a reduction gearing 43 (Figure 1), which includes a driven stub shaft 44. The end of the shaft 44 is threaded axially through a cap member 45 which is screwed onto one end of a cylindrical casing 46 (Figures 5 and 6) and when the shaft is rotated, its end moves axially within the casing. The opposite end of the casing is closed by a cap 47 and a central transverse partition 48 is located within said casing and divides the same into two chamber A and B. The partition is formed with an axial opening which receives a valve seat collar 49. Manifestly, communication between the chambers is established through the collar 49.

A water supply line 17' leads from a suitable source and is connected into the top of the chamber A. The line 17 leads from the lower end of the chamber and, as has been explained, is connected to the supply pipe 16, whereby a supply of water is conducted through the chamber A of the casing 46.

For introducing liquid chlorine into the chamber A so that said chlorine is admixed with the water flowing through the line 17 to the main pipe 16, a chlorine supply pipe 50 is connected to the upper end of the chamber B. From the chamber B, the chlorine flows through the collar 49 and to the chamber A, where it is admixed with the water and then conducted to the main water pipe 16, so as to purify and sterilize the water flowing through the main pipe.

For controlling the flow of chlorine through the collar 49, a metering pin or valve 51 is movable axially within the chamber A and is adapted to seat on the edge of the collar 49 to entirely close the bore thereof. This pin is carried by a diaphragm 52 which extends transversely across the chamber A. The opposite side of the diaphragm is normally engaging the end of the stub shaft 44 which is threaded through the end cap 45 and which is controlled in its rotation by the electric motor 41, being held in such engagement by the pressure of the water in the chamber A and in the lines 17 and 17'. A coiled spring 53 surrounds the end of the shaft 44, being confined between the diaphragm 52 and cap 45 and this spring exerts its tension to constantly urge the diaphragm away from the end of the shaft, which urges the metering pin 51 toward a seated position on the collar 49. Thus, it will be seen that the water pressure holds the diaphragm in engagement with the end of the shaft 44 and the position of the shaft controls the position of the pin 51 with relation to the seat 49. When the shaft is rotated so as to move inwardly of the casing the pin 51 is moved inwardly of its seat to cut down the flow of chlorine from the chamber B to the chamber A and, similarly, when the shaft 44 moves in an opposite direction, the pin 51 is moved away from its seat to increase the flow of chlorine. In the event that the water pressure in the chamber A and lines 17 and 17' falls below a predetermined pressure, the spring 53 will immediately move the diaphragm away from the end of the shaft 44 and will cause the pin 51, carried by said diaphragm, to seat, thereby cutting off the flow of chlorine until such time as the water pressure returns to normal. Manifestly, the shaft 44 normally meters and controls the flow or introduction of chlorine into the water and the diaphragm 52 and spring 53 merely function as a safety means to completely cut off the chlorine when the water pressure falls below normal.

For automatically shutting off the communication between the chambers A and B in the event that the pressure of the chlorine falls below a predetermined pressure, a diaphragm 54 is located within the chamber B. This diaphragm is similar to the diaphragm 52 in the chamber A and carries an axial pin 55 which is adapted to seat on the collar 49 to close the bore thereof. A coiled spring 56 has one end engaging the opposite side of the diaphragm 54 and its opposite end surrounds the end of an adjusting pin 57 and engages a shoulder 58 on said pin. The adjusting pin is threaded through the cap 47 and by adjusting said pin, the tension of the spring 56 on the diaphragm 54 may be varied. Normally the diaphragm is held, by the chlorine pressure, in the position shown in Figure 6, with the metering pin 55 held away from the collar 49 to permit a flow therethrough. However, when the chlorine pressure falls below a predetermined pressure, the spring 56 immediately seats the pin 55 to cut off communication between the chambers.

From the foregoing, it will be seen that the amount of chlorine which is introduced into the water in the chamber A and which flows into the main supply pipe 16, is controlled and metered by the movement of the shaft 44. This shaft 44 is rotated by the electric motor 41, the shaft of which is operated in one direction or the other by the triodes 39 and 40. The triodes are controlled by the discharging of the condensers 37 and 38, which condensers are discharged by the photoelectric cells 35 and 36 of the twin photo tube. The cells are receiving the light rays through the tubes 20 and 30 and the amount of light rays passing through said tubes act upon the cells, and therefore, it is obvious that the light rays passing through the tubes, in effect, control the metering of the chlorine into the water, as will now be explained in detail.

In the operation of the device, reference is made to Figure 7, wherein electrical current is supplied through electrical supply wires 60 and 61. These wires may carry the usual 110 volt A. C. The wire 60 is connected to a switch blade 62 which is adapted to engage a switch arm 63 to make electrical connection therewith. The arm 63 is connected by a wire 63a to one side of the primary winding 64 of a transformer T, while the other side of the transformer winding is directly connected to the other side of the circuit which is the wire 61. Voltage divider resistances 65 and 66 are connected across the wires 63a and 61, and the purposes of these resistances will be hereinafter explained. When the switch blade 62 is engaging the switch blade 63, a current is flowing through the wires 60, 63a, primary winding 64, resistances 65 and 66, and wire 61.

A second switch arm 67 is located below the arm 63 and when the blade 62 is depressed sufficiently, an electrical connection is made between said blade and the two arms therebelow. The arm 67 is connected by a wire 67a to a lead 68a which extends from one side of the low voltage secondary winding 68 of the transformer T. The wire 67a is also connected to the connecting wire between the resistances 65 and 66. The lead 68a has its end connected to one side of the cathode 69 of the gaseous triode tube 39 and also to one side of the cathode 69' of the tube 40. The other side of the transformer secondary winding 68 is electrically connected by a wire 69a to the other side of the cathodes of said tubes.

The anode 70 of the triode 39 is connected by a wire 70a with one winding 71 of the motor 41, while the anode 70' of the triode 40 is connected by a wire 70b with a second winding 72 of the motor. This latter winding is opposite to the winding 71 and obviously, when the winding 71 is energized the motor shaft 42 is rotated in one direction, while energization of the other winding 72 rotates the shaft in an opposite direction. The windings 71 and 72 are electrically connected through a lead 72a with one side of the armature 73 of the motor and the opposite side of said armature is connected by a wire 73a with one of the current supply wires 61. Thus, the anodes of the triode tubes 39 and 40 are connected to one side of the current supply through the motor 41.

The incandescent lamp 33 which provides the light rays passing through the tubes 20 and 30 is supplied with current through wires 33a and 33b which lead from the main supply wire 61 and from the wire 63a respectively. Thus, when the contact blade 62 is depressed to engage the contact arm 63, the lamp is illuminated.

The twin photo tube 34 and the condensers 37 and 38 are connected in the electrical circuit in the manner shown in Figure 7. A wire 38a leads from the supply wire 33b to one side of the condenser 38. A short lead 37a connects the wire 38a to one side of the condenser 37. The wire 38a is also connected by a wire 38' to the anodes 35a and 36a of the photoelectric cells 35 and 36. The cathode 35b of the cell 35 is electrically connected by a wire 75a to the grid 75 of the triode tube 39 and a lead 75b extends from the wire 75a to the condenser 37, whereby the cathode 35b is also connected with one side of the condenser. The cathode 36b of the photoelectric cell 36 is connected to the grid 75' of the triode tube 40 by a wire 75c, and this cathode is also electrically connected to one side of the condenser 38 by a lead 75d extending from the wire 75c. With the above arrangement, the condenser 37 is associated with the grid 75 of the triode tube 39 while the condenser 38 is associated with the tube 40.

In the operation of the device, a portion of the chlorinated water from the main supply pipe 16 (Figure 1) is conducted through the line 15 to the tube 20 and this water flows through said tube. From the tube 20, the water passes to the mixing tube 25 and just prior to its entrance into said tube acid orthotoluidine, or other reagent is introduced therein. This reagent admixes with the chlorinated water and reacts with the excess chlorine therein to color said water. The colored water is then conducted through the tube 30 and thus, it will be manifest that uncolored chlorinated water is flowing through the tube 20, while the colored chlorinated water is flowing through the tube 30. The tubes 20 and 30 are located so that when the lamp 33 is illuminated light rays are directed therethrough and onto the photoelectric cells 35 and 36 of the twin photo tube 34.

The flow through the tubes 20 and 30 is continuous but the electrical apparatus is dormant until it is desired to test the water for the excess amount of chlorine therein and to increase or decrease the supply of chlorine to the pipe 16 in accordance with the results of such tests.

When the test is to be made the switch blade 62 is engaged with the switch arm 63 to close an electrical circuit therebetween. This may be done manually but it is preferable to employ a cam disk 76 (Figures 7 to 9) having a projection 77 thereon. This disk may be mounted on shaft 78, which is rotated by a timing motor which operates at a predetermined speed (not shown) whereby the blade 62 and arm 63 will be engaged at regular intervals and the test and adjustment accomplished automatically.

When the blade 62 engages the arm 63, the lamp 33 is illuminated and the transformer T is energized and the cathodes 69 and 69' of the triode tubes 39 and 40 gradually reach operating temperature. As this occurs, negative charges are built up on the grids 75 and 75' of the tubes, across the condensers, by the diode rectifying action of the cathode-grid circuits of the triode tubes. The electrical circuit at this time is from the supply wire 60, through blade 62 and arm 63, wires 63a, 33b, and 38a, condensers 37 and 38 and to the photo tube 34. From the condensers the current flows through wires 75a and 75c to the grids 75 and 75' of the triode tubes and from the grids to the cathodes 69 and 69'. The cathodes are connected through the wires 68a and 69a to the other supply wire 61 to complete the circuit.

As has been stated, the flow of current in this manner builds up negative charges on the grids 75 and 75' due to the diode rectifying action of the cathode-grid circuits of the tubes 39 and 40. This action prevents flow of current in the cathode-anode circuits of said tubes and thus, the condensers 37 and 38 are charged. The projection 77 on the cam disk 76 holds the blade 62 and arm 63 in engagement for a sufficient length of time to permit the cathodes of the triode tubes to reach operating temperature and to charge the condensers.

When this condition is reached, an enlarged projection 79 on the cam disk 76 engages the blade 62 and depresses it sufficiently so that electrical connection is made between the blade 62 and both arms 63 and 67 therebeneath (Figure 9). This movement of the blade causes the full voltage of the supply to be impressed across the anode-cathode circuits of the triode tubes 39 and 40, the flow being through wire 60, blade 62, arms 63 and 67, wire 67a, and to the cathodes 69 and 69'. The anodes 70 and 70' are connected to the other side of the supply circuit, which is the wire 61 through the motor 41. The impression of the full voltage of the supply across the anode-cathode circuits of the triode tubes leaves the grids 75 and 75' charged only by the charges across the condensers 37 and 38 respectively. These charges have been made sufficiently negative by the proper selection of the resistances 65 and 66, to effectively block the flow of current in the anode-cathode circuits of the triode tubes.

Light rays striking the photoelectric cells 35 and 36 progressively discharge the condensers 37 and 38 respectively, until current starts flowing in the anode-cathode circuits of the triode tubes. The greater the amount of light striking the cells, the more quickly discharge of the condensers will occur. As soon as one condenser is discharged, to a critical point, a current flow in the anode-cathode circuit of the tube to which it is connected is permitted and when such current flow occurs, the motor winding to which said triode tube is connected is energized to rotate the motor shaft 42 in one direction. Such rotation of the motor shaft moves the stub shaft 44 (Figure 5) to meter the flow of chlorine into the chamber A and thence into the main water pipe 16, as has been explained. As soon as the second condenser discharges, the flow of current through the anode-cathode circuit of the second triode tube energizes its motor winding and a balance in the motor is obtained to halt rotation of the shaft. Of course, if the second condenser were the first to discharge to a critical point, then the motor shaft would be rotated in an opposite direction. Thus, the motor shaft controls the movement of the stub shaft 44 which shaft moves the metering pin 51 to adjust the flow, and said shaft is actuated in a given direction to increase or decrease the flow in accordance with the discharging of the condensers. The discharging of the condenser is in turn, controlled by the amount of light striking the photoelectric cells 35 and 36.

The light passing through the glass tube 20 having uncolored chlorinated water therein will be more than the light passing through the colored water in the glass tube 30 and, therefore, the condenser 37 controlled by the cell 35 would always be discharged first unless some compensation is made. It is preferable in constructing the device to reduce the size of the light opening at the end of the tube 20 with relation to the size of the light opening at the end of the tube 30, whereby when the correct amount of chlorine is in the water, the color thereof is such that an equal amount of light will pass through both tubes 20 and 30 and strike the cells 35 and 36. With such arrangement, with the proper amount of chlorine in the water, the condensers will discharge simultaneously with the result that current will flow simultaneously in the anode-cathode circuits of the tubes. Such simultaneous flow through these circuits of the tubes will not operate the motor shaft 42 due to the cancelling of field excitation and no change in the adjustment of the metering pin 51 occurs.

If conditions occur, that is, if the contents of the water undergo change so as to require additional chlorine for sterilizing purposes then obviously the amount of chlorine which under previous conditions was excessive is no longer excessive with the result that the color of the chlorine and orthotoluidine solution becomes lighter. When this happens, then upon the next operation of the apparatus, the cell 36 receives more light than the cell 35 because the light absorption of the liquid in the tube 30 has been reduced by the change in color. Therefore, the condenser 38 is discharged first and the current flow through the anode-cathode circuit of the triode tube 40 energizes the winding 72 of the motor to rotate the motor shaft 42 in a direction to move the shaft to the left in Figure 5. Such movement of the shaft will tend to move the end of the shaft away from the diaphragm 52 and metering pin 51 but since the water pressure within the chamber A is acting upon the diaphragm and is greater than the pressure of the spring 53, such pressure holds the diaphragm in engagement with said shaft, with the result that the metering pin 51 is moved away from the collar 49, whereby more chlorine is introduced. This movement of the pin continues until the motor is stopped by the energization of the winding 71 by the tube 39, which is the result of the discharging of the condenser 37. Thus, the chlorine supply to the main line is automatically increased. Of course, as explained, if for any reason the water pressure within the chamber falls below a predetermined point, as controlled by the pressure of the spring 53, said spring immediately urges the diaphragm away from the shaft and causes the pin 51 to seat on the collar and close the bore thereof. Thus, the diaphragm and its co-action with the shaft is a safety feature which automatically cuts off the chlorine supply in case of a failure in the water supply. This diaphragm arrangement is not essential and if desired, the pin 51 could be connected directly to the shaft 44.

Upon the next operation of the apparatus by the cam disk 76, the test is again repeated. If sufficient chlorine has been introduced, the condensers discharge simultaneously and no change is made. If more chlorine than is necessary has been introduced, then the condenser 37 is first to discharge with the result that the motor shaft is operated in a reverse direction to move the shaft 44 inwardly of the chamber A. Such inward movement transmits a similar movement to the pin 51, the diaphragm moving inwardly against the water pressure in the chamber A. Obviously, as the pin is moved in this direction (toward the right in Figure 6) it reduces the size of the chlorine inlet formed by the bore of the collar 49, whereby the chlorine supply is reduced. It is pointed out that the pin 55 has no part in the metering of the chlorine and is provided solely for the purpose of safety to prevent the water from chamber A flowing into the chamber B in the event that the chlorine pressure falls below a predetermined point. Normally, the pressure of the chlorine acting on the diaphragm 54 holds the pin 55 in an open position (Figure 6) and said pin remains in this position at all times, moving to a closed position only when the chlorine pressure falls below a predetermined point. The cam disk 76 is preferably operated by a time mechanism whereby the tests and adjustments are made at regular intervals. The adjustment is automatic and after the apparatus has been set will operate to maintain the proper amount of chlorine in the water at all times and under all conditions.

It is noted that the gaseous triode tubes 39 and 40 may be purchased on the open market and each is identified as an "R. C. A." tube #885. They are particularly adapted for the purpose as they act with a trigger action. So long as there is a negative grid voltage above a certain critical value, there is no current flow through the anode-cathode circuit of the tube; however, as soon as this voltage drops below this critical value, the flow of current begins immediately.

It has been found that many times water has present therein certain substances or matter which will react with orthotoluidine to give a color to the water and such coloration might be misleading in that the observer might mistake the coloration as denoting an excess of chlorine. In flowing water of this nature through the device, orthotoluidine would be added to the unchlorinated water and then conducted through the tube 20, whereby any coloring due to the reaction of the substances in the water and the orthotoluidine would be apparent in the tube 20. From this tube, the water is conducted to waste. Chlorinated water with orthotoluidine added is conducted through the tube 30 and thus, the relative difference in light absorption qualities of the unchlorinated water having orthotoluidine admixed therewith, and the chlorinated water and orthotoluidine solution, would be utilized to accurately control the chlorine supply.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent is:

1. A chlorinating device for introducing chlorine into a water supply line including, a water supply line, a chlorine supply line connected with said water line for conducting chlorine thereto, a metering apparatus connected in the chlorine supply line for controlling the introduction of chlorine into the water line, a transparent tube, means for conducting a portion of the chlorinated water through the tube, means for admixing a reagent with the chlorinated water after it has passed through the tube whereby the water is colored, a second transparent tube, means for conducting the colored water through the second tube, a light source for directing light rays through the liquid in both tubes, operating means connected with the metering apparatus for controlling the actuation thereof, and means responsive to the light rays after said rays have passed through the liquid in said tubes, whereby said means is actuated in accordance with the light absorbing qualities of the liquid in the two tubes, said light-absorbing qualities being controlled by the color of said liquid, said light responsive means being associated with the operating means to operate the same and thereby control actuation of the metering apparatus in accordance with the relative color difference between the liquid in the two tubes so that the introduction of chlorine into the water line is controlled by the relative color differences between the liquid in the two tubes.

2. A chlorinating devices for introducing chlorine into a water supply line including, a water supply line, a chlorine supply line connected with said water line for conducting chlorine thereto, a metering apparatus connected in the chlorine supply line for controlling the introduction of chlorine into the water line, a transparent tube, means for conducting a portion of the chlorinated water through the tube, means for admixing a reagent with the chlorinated water after it has passed through the tube, whereby the water is colored, a second transparent tube, means for conducting the colored water through the second tube, a light source for directing light rays through the liquid in both tubes, operating means connected with the metering apparatus for controlling the actuation thereof, and a photoelectric cell for each tube for receiving the light rays passing through the liquid in said tube, whereby the cells receive light rays in accordance with the relative color difference between the liquid in the two tubes and means controlled by the photoelectric cells for actuating the operating means in accordance with the relative color difference of the liquid in the two tubes, to operate the metering apparatus, whereby the introduction of chlorine into the water line is in accordance with the relative color difference between the liquid in the two tubes.

3. A chlorinating device for introducing chlorine into a water supply line including, a water supply line, a chlorine supply line connected with said water line for conducting chlorine thereto, a metering apparatus connected in the chlorine supply line for controlling the introduction of chlorine into the water line, a transparent tube, means for conducting a portion of the chlorinated water through the tube, means for admixing a reagent with the chlorinated water after it has passed through the tube, whereby the water is colored, a second transparent tube, means for conducting the colored water through the second tube, a light source for directing light rays through the liquid in both tubes, a photoelectric cell for each tube for receiving the light rays passing through the liquid in said tube, the intensity of light received by each cell being controlled by the light absorbing qualities of the liquid in the tube, whereby the received light is in accordance with the relative color difference of the liquid in the two tubes, an electric motor having two oppositely wound field windings for operating the metering apparatus, and a pair of triode tubes for controlling the energization of the field windings and electrically connected to the photoelectrical cells, whereby the cells control the flow of current through the tubes and thereby control the operation of the motor and metering apparatus.

4. A chlorinating device for introducing chlorine into a water line including, a water line, a chlorine supply pipe connected to said line for introducing chlorine into the water therein, a metering apparatus connected in the chlorine pipe for controlling the introduction of chlorine into the water line, a testing apparatus communicating with the water line for receiving a portion of the chlorinated water and having means for adding a reagent to said chlorinated water to color the same, electrical means actuated in response to the relative color difference between the chlorinated water and the chlorinated water having the reagent added, rotatable operating means controlled in its operation by the electrical means and connected with the metering apparatus to actuate the same, whereby the metering apparatus is actuated in accordance with the relative color difference between the chlorinated water and the chlorinated water with reagent added, and valve means associated with the metering apparatus and connected in the water line so as to be responsive to the pressure of the water therein for automatically shutting off the flow of chlorine into the water line when the water pressure in said line falls below a predetermined point.

5. A chlorinating device as set forth in claim 4, with pressure actuated means forming part of the metering apparatus, said means being responsive to the pressure of the chlorine therein and shutting off the flow of chlorine through said metering apparatus when the pressure of said chlorine falls below a predetermined point.

6. As a sub-combination in a chlorinating device, a testing apparatus including, a tube through which chlorinated water is conducted, means for adding a reagent to said water after it has passed through the tube to color the water in accordance with the chlorine present therein, a second tube; means for conducting the colored water through the second tube while additional chlorinated water is flowing through the first tube, means for directing light rays through the tubes, and means for receiving the light rays to determine the relative color difference between the clear chlorinated water in the first tube and the colored water in the second tube.

7. A chlorinating device for introducing chlorine into a water supply line including, a water supply line, a chlorine supply line connected with said water line for conducting chlorine thereto, a metering apparatus connected in the chlorine supply line for controlling the introduction of chlorine into the water line, a transparent tube, means for conducting a portion of the chlorinated water through the tube, means for admixing a reagent with the chlorinated water after it has passed through the tube whereby the water is colored, a second transparent tube, means for conducting the colored water through the second tube, a light source for directing light rays through the liquid in both tubes, operating means connected with the metering apparatus for controlling the actuation thereof, a photoelectric cell for each tube for receiving light rays passing through the liquid in said tube whereby the cells receive light in accordance with the color difference between the liquid in the two tubes, electrical means controlled by the photoelectric cells for controlling the actuation of the operating means in accordance with the light received by the cells to operate the metering apparatus, and means within the metering apparatus responsive to the water pressure in the water line for automatically shutting off the chlorine supply through said apparatus when the water pressure falls below a predetermined amount.

8. A chlorinating device for introducing chlorine into a water supply line including, a water supply line, a chlorine supply line connected with said water line for conducting chlorine thereto, a metering apparatus connected in the chlorine supply line for controlling the introduction of chlorine into the water line, a transparent tube, means for conducting a portion of the chlorinated water through the tube, means for admixing a reagent with the chlorinated water after it has passed through the tube whereby the water is colored, a second transparent tube, means for conducting the colored water through the second tube, a light source for directing light rays through the liquid in both tubes, operating means connected with the metering apparatus for controlling the actuation thereof, a photoelectric cell for each tube for receiving light rays passing through the liquid in said tube whereby the cells receive light in accordance with the color difference between the liquid in the two tubes, electrical means controlled by the photoelectric cells for controlling the actuation of the operating means in accordance with the light received by the cells to operate the metering apparatus, and means forming part of the metering apparatus and connected in the chlorine supply line responsive to the pressure of said chlorine for shutting off the flow of chlorine when the pressure thereof falls below a predetermined point.

MARION H. ROWE.